Sept. 3, 1935.  C. L. KENNEY  2,013,445
MASHING APPARATUS FOR BREWING
Filed July 23, 1934  2 Sheets-Sheet 1
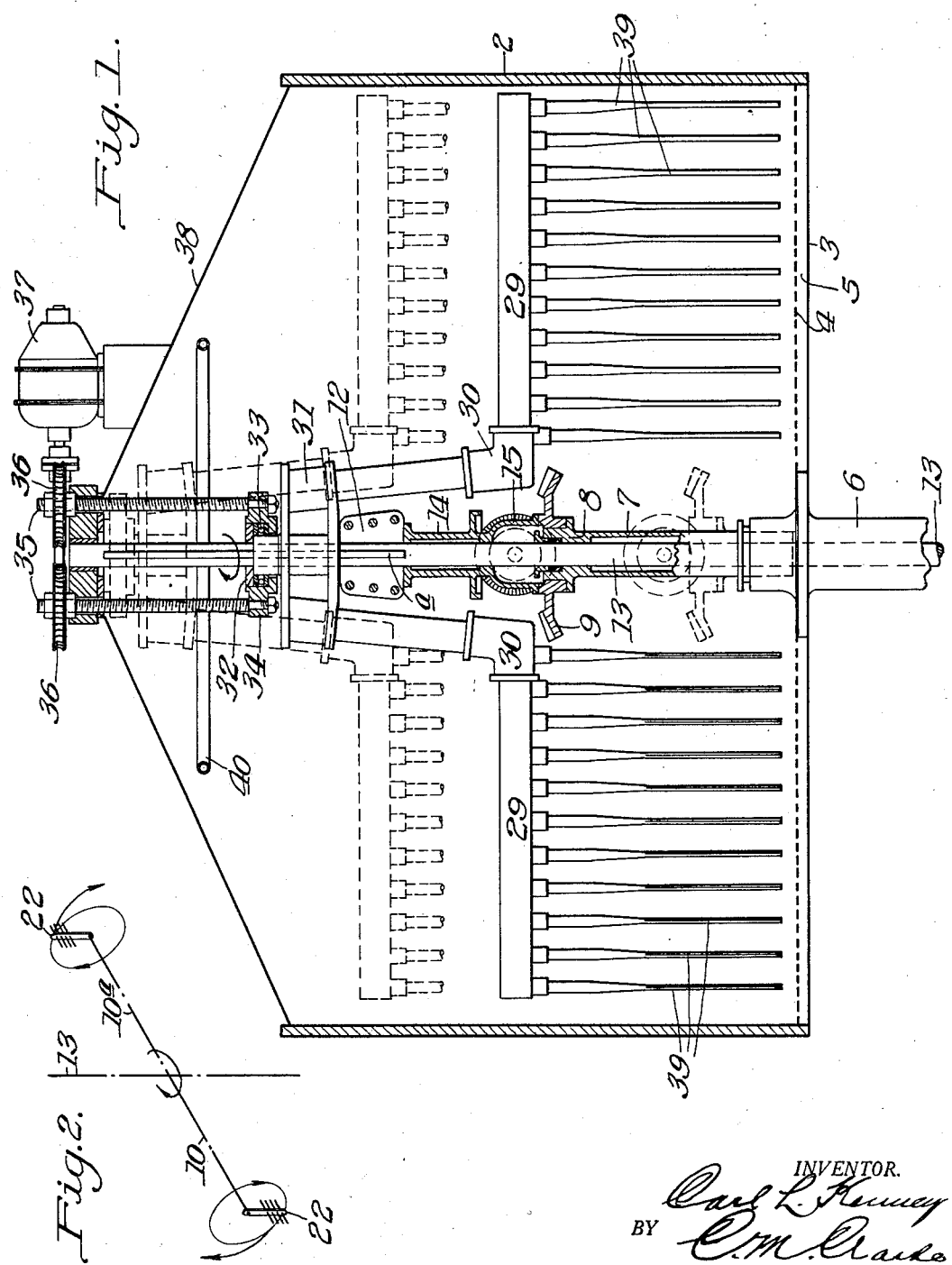
INVENTOR.
Carl L. Kenney
BY
C. M. Clarke
ATTORNEY.

Sept. 3, 1935. C. L. KENNEY 2,013,445
MASHING APPARATUS FOR BREWING
Filed July 23, 1934 2 Sheets-Sheet 2
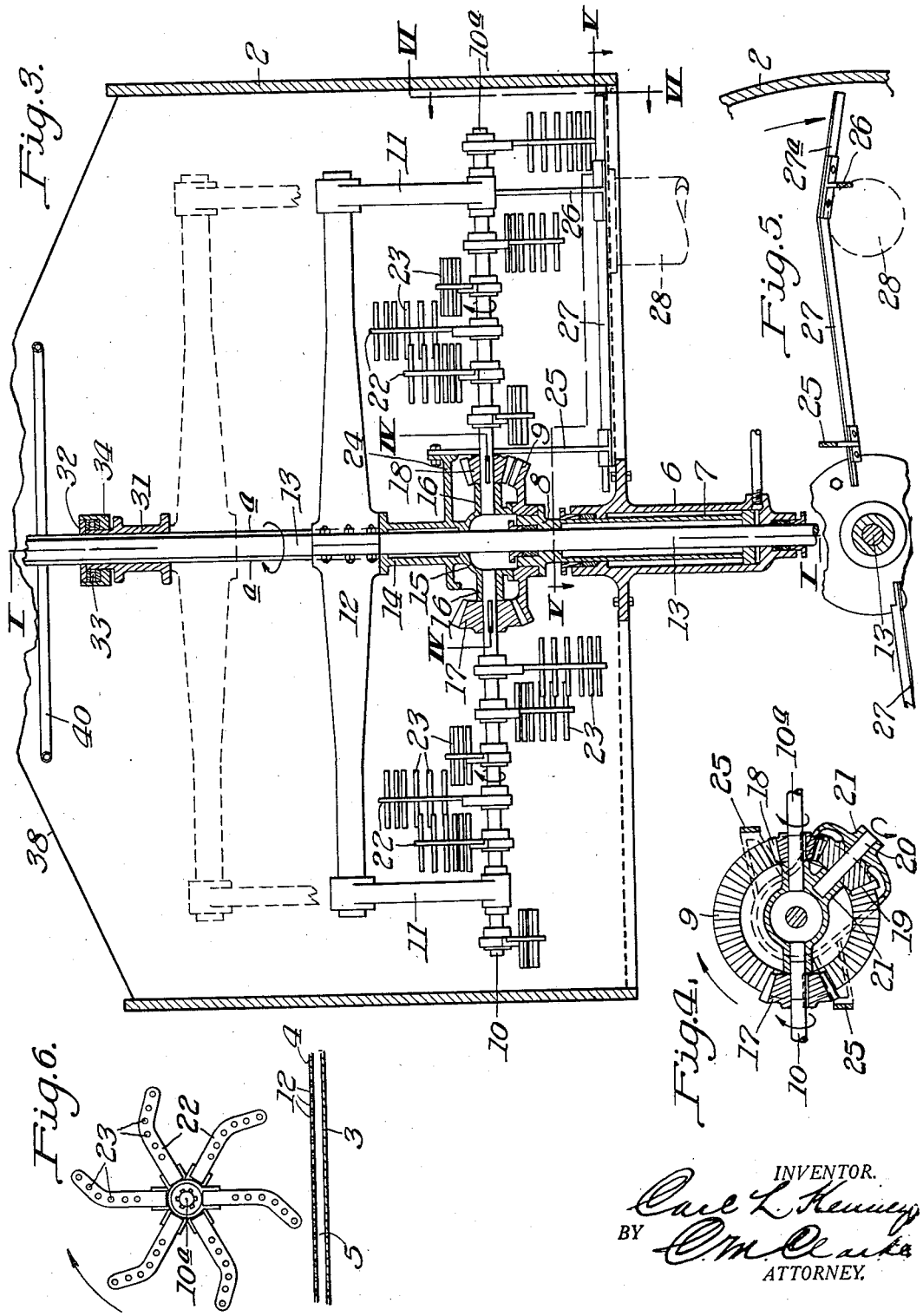
INVENTOR.
Carl L. Kenney
BY
ATTORNEY.

Patented Sept. 3, 1935

2,013,445

UNITED STATES PATENT OFFICE 2,013,445

MASHING APPARATUS FOR BREWING

Carl L. Kenney, Pittsburgh, Pa.

Application July 23, 1934, Serial No. 736,456

14 Claims. (Cl. 259—102)

This invention consists of an improvement in the art of brewing beer and the like, and comprises an improved mashing and lautering tub and its accompanying mechanism, as hereinafter more fully described.

Following the usual practice the several initial preparations and treatments of the mash are performed in a separate circular tub, and the mash is then transferred to the mixing or stirring and lautering tub of the present application.

In their entirety the several main brewing operations follow the essential main steps of established practice, in mashing, stirring, lautering, sparging and grain removal. Without describing these in detail, the mashing operation consists in cooking the meal in water at a proper temperature for combining two cereals, as malt and corn or malt and rice. The malt combines with the starches to form sugar and the process is continued until all sugar is in solution.

The mash is then thoroughly mixed by passing stirring arms or the like through the mash in a general annular path with progressive rotation of the arms therethrough. The present invention has in view an improved construction and operation providing for alternate acceleration and retardation of the mixing of the mash, for thorough treatment.

Lautering consists in stirring or loosening the mash and drawing off the liquid extracts resulting from the mashing process, leaving behind the spent grains. In sparging, water is added to the mash, followed by further lautering to remove additional liquid extracts, with final removal of the spent grains by scraping them into the grain outlets.

In the present invention I have provided in a single tub a combination of rotary mashing or stirring elements provided with annularly moving scrapers, and a lautering mechanism including an individually controlled aufhack. The stirring elements with the scraper, and the aufhack, are each individually controlled and capable of individual elevation and lowering and of simultaneous rotation.

The operation in its successive steps, provides:—

(a) Lowering of the stirrers and scrapers into the mash and their rotation therethrough, during elevation of the aufhack;

(b) Lowering of the aufhack into the mash and its rotation with the stirrers and scrapers elevated;

(c) Lautering by annular rotation of the aufhack blades;

(d) Sparging;

(e) Elevation of the aufhack and lowering of the stirrers and scrapers for removing spent grains to outlets.

The invention therefore includes separate stirring and scraping devices and a separate aufhack in a mash tub, each individually operative and provided with appropriate actuating means, and the construction and operation will be understood from the following description.

One preferred form of the invention is illustrated in the accompanying drawings, in which:

Fig. 1 is a complete transverse vertical section on the line I—I of Fig. 3, showing the stirrers and scrapers lowered;

Fig. 2 is a perspective diagram illustrating the stirring operation;

Fig. 3 is a partial transverse vertical section of Fig. 1, showing the mashing apparatus lowered;

Fig. 4 is a sectional plan view on the line IV—IV of Fig. 3, showing the stirrer actuating gearing;

Fig. 5 is a partial similar view showing the scraper construction;

Fig. 6 is a sectional end view on the line VI—VI of Fig. 3, showing the stirrers and their radially spaced arms.

Referring to the drawings, the mash tub 2 is of usual cylindrical construction having a closed plate metal bottom 3 and an inner false bottom 4, perforated for seepage of liquid to the intervening space 5. The permanent bottom 3 is provided with a valved grain outlet 28, and the false bottom 4 is preferably made in sections of bronze plates, slotted as at 12, one section having an opening giving access to the grain outlet, not necessarily herein described.

Midway of the mash tub and rigidly incorporated with the bottom 3 is a hydraulic cylinder 6. In said cylinder is mounted the plunger 7 extending up through a stuffing box and terminating in a gear supporting head 8 on which is fixedly mounted the bevel rack gear 9. Said gear is non-rotatable but is vertically adjustable with its associated actuating gears and the stirring mechanism as a whole.

The stirring arm shafts 10 and 10a extend in diametrically opposite directions and are journalled at their outer ends in the terminals of depending arms 11 of a sectional cross yoke 12.

Said yoke is in keyway engagement with splines or keys a of the central rotating shaft 13 which extends centrally through plunger 7, the stirrer arm, and the aufhack cross-head support, and is in driving engagement below with a suitable motor, not shown.

The yoke 12 is carried by an extension 14 of a supporting and bearing head 15 which rests rotatably on the upper hub surface of gear 9. Head 15 is provided with journal bearings 16 for the inner ends of shafts 10 and 10a and the shafts are designed to be rotated in the same direction and preferably at different speeds, for reasons hereinafter described. To such end, one shaft as 10, is provided with a bevel gear 17 directly intermeshing with fixed bevel 9.

Shaft 10a is provided with a smaller bevel pinion 18, out of mesh with gear 9, but in operative connection therewith by an idler bevel 19 of shaft 20 journalled in bearings 21 of head 15. By such arrangement, when yoke 12 and head 15 are rotated by spline shaft 13, shafts 10 and 10a are swung around annularly, with rotation of shaft 10a in the same direction as shaft 10 but at a faster speed, due to the smaller pinion 18.

Stirring is effected by rotation of shafts 10 and 10a, and the series of arms 22 extending therefrom at different locations, along the shaft and at varying radial positions.

The arms progressively advance one beyond the other, in their spiral placement around the shafts so as to balance the actuating power and resistance as the arms successively pass into and through the mash.

As observed, the terminals of the arms 22 are deflected in the direction of their rotation whereby to effect an approximation of scooping action in their annular rotation.

Bars 23 extend outwardly from the arms at each side, slightly overlapping the path of the preceding and following arms, except at each side of supports 11, whereby very thorough mixing of the mash is effected.

By reason of the variable speeds of shafts 10 and 10a, and due to the fact that both shafts are rotating in the same direction, due to the gearing, it will be observed that the rotating speed of the arms and their rods at one side of the center will be considerably faster than the rotating speed of the arms and rods of the other shaft, in relation to their general annular movement over the stationary bottom of the tank, and through the stationary mass of mash.

The result of such arrangement and operation is that the mash, especially its upper portion, will be very vigorously agitated and its lower portion very slowly agitated by the stirrers of one set of arms. The action effecting comparatively slow agitation of the upper portion of the mash, and very rapid relative movement through its lower portion, of the following set of arms will be reversely modified, as to the relative speed of the stirrers with relation thereto.

In other words, the stirrers of one shaft will be accelerated in their movement through the upper portion of the mash and those of the other shaft will be accelerated through its lower portion. This is due to a constant annular travel and an alternating rotation as the stirrers of each shaft progress through the mash successively. This results in giving alternating stirring treatment. Such treatment is of considerable advantage in thorough and rapid mixing of the mash.

Head 15 is provided with oppositely extending brackets 24 and depending arms 25, a similar arm 26 depending from each outer arm 11 of the cross yoke 12. To the lower terminals of arms 25 and 26 are secured inclined scrapers 27 of the construction illustrated in my companion application Serial No. 736,455 filed herewith.

These are of a form and angle arrangement to operatively pass closely above the bottom plates 4 and are capable of being lowered with the stirrer construction closely adjacent to the false bottom 4 for removing rotation thereover. The scrapers are so mounted on their fixed supporting arms 25 and 26 in a general radial direction from the center shaft, but are deflected forwardly slightly in the direction of their rotative travel.

Their terminals 27a are further deflected as in Fig. 5 whereby to insure engagement with the spent grains and their collective discharge through the grains valve discharge opening 28 as the yoke and stirrer shafts are rotated horizontally.

Arranged substantially at right angles to the cross yoke 12 and shafts 10 and 10a are the radially disposed aufhack arms 29, preferably of heavy steel pipe having elbows 30 rigidly connected as by welding, with arms depending below the opposite ends of a supporting cross-head 31.

The aufhack cross-head is capable of independent vertical adjustment along shaft 13 and of simultaneous rotation by spline engagement a with oppositely located keyways in the crosshead, as in the yoke 12.

Head 31 depends by its central flanged extension 32 on a series of ball-bearings 33 supported on a thrust bearing raceway of the raising and lowering cross-head 34. Such construction supports the weight of the aufhack with no appreciable resistance to rotation.

The cross-head 34 and head 31 are raised and lowered by a pair of screws 35 of right and left-hand threads respectively, in threaded engagement with the hubs of worm wheels 36, also of right and left-hand threads. These are in driving engagement with appropriate worms of the shaft of a motor 37. Such power equipment is mounted on the cover frame 38 of the tub, as in Fig. 1.

By such arrangement the thrust of the worms will be balanced one against the other, and sufficient end play will be provided to permit the lift of the screws to equalize.

The aufhack arms 29 are provided with series of sockets of seamless tubing welded to the under sides of the arms, into which are fixedly inserted the ends of stirring blades 39 preferably fastened by two sets of screws to each. The blades 39 may be formed of extra heavy pipe, forged down at their lower ends to proper shape for stirring the mash, or otherwise as desired.

Sparging is effected by supplying water from the annular perforated pipe 40 as required in the usual manner.

What I claim is:

1. In combination with a tank having a central vertical drive shaft, a cylinder having a raising and lowering plunger, a non-rotating rack gear thereon, a rotatable head mounted on the rack gear and having inner shaft bearings, a yoke mounted on the head in sliding spline engagement with the drive shaft, outer shaft bearings depending from the yoke, a pair of oppositely disposed radially extending shafts journalled in said bearings each provided with a series of stirring arms, gearing connecting each of said shafts with the rack gear for rotation in the same direction to effect alternating stirring, and a scraper having arms connected with the rotatable head and said outer shaft bearing respectively.

2. A stirring and lautering tank provided with a rotatable double side stirring mechanism and a rotatable double side aufhack arranged radially between the stirring mechanism, means for rotating them together, and means for raising and lowering each independently.

3. A stirring and lautering tank provided with a rotatable double side stirring mechanism and a rotatable double side aufhack, a central shaft having operative engagement with both, one of said double side members having a middle U-shape portion providing vertical approach toward the other member without interference.

4. In combination with a stirring and lautering tank and a central spline shaft, a double side stirring member and a double side aufhack member in rotatable engagement with the shaft, and raising and lowering means for each member, one of said double side members having a middle U-shape portion providing vertical approach toward the other member without interference.

5. A stirring and lautering tank provided with annularly rotatable double side stirring and scraping means, an annularly rotatable double side aufhack, and means for rotating them together, one of said double side members having a middle U-shape portion providing vertical approach toward the other member without interference.

6. A stirring and lautering tank provided with annularly rotatable double side stirring and scraping means, an annularly rotatable double side aufhack, means for rotating them together, and means for raising and lowering the stirring and scraping means and the aufhack independently, one of said double side members having a middle U-shape portion providing vertical approach toward the other member without interference.

7. A mashing machine having a central vertical rotatable shaft, a stationary rack gear, and a pair of oppositely extending stirring shafts in axial alinement provided with radially disposed rotary stirrers, each of said shafts having an inner gear in driving connection with the rack gear, a supporting yoke in spline engagement with the vertical shaft having outer depending bearings for the stirring shafts, a one piece rotatable head member surrounding the vertical shaft in abutting supporting engagement with the yoke and having bearings for the inner ends of the stirring shafts and integral scraper supporting brackets, scrapers connected with said brackets, and under-imposed elevating and lowering means supporting the rack gear and said rotatable head member.

8. A mashing machine having a central vertical rotatable shaft, a stationary rack gear, and a pair of oppositely extending stirring shafts in axial alinement provided with radially disposed rotary stirrers, each of said shafts having an inner gear in driving connection with the rack gear embodying means for rotating the stirring shafts together in the same direction, a supporting yoke in spline engagement with the vertical shaft having outer depending bearings for the stirring shafts, a one piece rotatable head member surrounding the vertical shaft in abutting supporting engagement with the yoke and having bearings for the inner ends of the stirring shafts and integral scraper supporting brackets, scrapers connected with said brackets, and under-imposed elevating and lowering means supporting the rack gear and said rotatable head member.

9. A mashing machine having a central vertical rotatable shaft, a stationary rack gear, and a pair of oppositely extending stirring shafts in axial alinement provided with radially disposed rotary stirrers, each of said shafts having an inner gear in driving connection with the rack gear embodying means for rotating the stirring shafts together in the same direction at varying speeds, a supporting yoke in spline engagement with the vertical shaft having outer depending bearings for the stirring shafts, a one piece rotatable head member surrounding the vertical shaft in abutting supporting engagement with the yoke and having bearings for the inner ends of the stirring shafts and integral scraper supporting brackets, scrapers connected with said brackets, and under-imposed elevating and lowering means supporting the rack gear and said rotatable head member.

10. A mashing machine having a central vertical rotatable shaft, a stationary rack gear, and a pair of oppositely extending stirring shafts in axial alinement provided with radially disposed rotary stirrers, each of said shafts having an inner gear in driving connection with the rack gear embodying means for rotating the stirring shafts together in the same direction whereby to effect alternating mashing in opposite directions at any given radial position, a supporting yoke in spline engagement with the vertical shaft having outer depending bearings for the stirring shafts, a one piece rotatable head member surrounding the vertical shaft in abutting supporting engagement with the yoke and having bearings for the inner ends of the stirring shafts and integral scraper supporting brackets, scrapers connected with said brackets, and under-imposed elevating and lowering means supporting the rack gear and said rotatable head member.

11. A mashing machine having a central vertical rotatable shaft, a stationary rack gear, and a pair of oppositely extending stirring shafts in axial alinement provided with radially disposed rotary stirrers, one of said shafts having a gear directly engaging the rack gear and the other having a gear in operative engagement with the rack gear through an idler gear, a supporting yoke in spline engagement with the vertical shaft having outer depending bearings for the stirring shafts, a one piece rotatable head member surrounding the vertical shaft in abutting supporting engagement with the yoke and having bearings for the inner ends of the stirring shafts and integral scraper supporting brackets, scrapers connected with said brackets, and under-imposed elevating and lowering means supporting the rack gear and said rotatable head member.

12. A mashing machine having a central vertical rotatable shaft, a stationary rack gear, and a pair of oppositely extending stirring shafts in axial alinement provided with radially disposed rotary stirrers, said stirrers having their outer portions deflected in the direction of rotation, each of said shafts having an inner gear in driving connection with the rack gear, a supporting yoke in spline engagement with the vertical shaft having outer depending bearings for the stirring shafts, a one piece rotatable head member surrounding the vertical shaft in abutting supporting engagement with the yoke and having bearings for the inner ends of the stirring shafts and laterally extending scraper supporting brackets, scrapers connected with said brackets, and under-imposed elevating and lowering means supporting the rack gear and said rotatable head member.

13. A mashing machine having a central vertical rotatable shaft, a stationary rack gear, and a pair of oppositely extending stirring shafts in axial alinement provided with radially disposed rotary stirrers, each of said shafts having an inner gear in driving connection with the rack gear, a supporting yoke in spline engagement with the vertical shaft having outer depending bearings for the stirring shafts, a one piece rotatable head member surrounding the vertical shaft in abutting supporting engagement with the yoke and having integral bearings for the inner ends of the stirring shafts and for an idler gear shaft, an idler gear having a shaft mounted in its said bearings and engaging the rack gear and one of said stirring shaft gears providing for said driving connection therebetween, and under-imposed elevating and lowering means supporting the rack gear and said rotatable head member.

14. A mashing machine having a central vertical rotatable shaft, a stationary rack gear, and a pair of oppositely extending stirring shafts in axial alinement provided with radially disposed rotary stirrers, each of said shafts having an inner gear in driving connection with the rack gear, a supporting yoke in spline engagement with the vertical shaft having outer depending bearings for the stirring shafts, a one piece rotatable head member surrounding the vertical shaft in abutting supporting engagement with the yoke and having integral scraper supporting brackets and bearings for the inner ends of the stirring shafts and for an idler gear shaft, an idler gear having a shaft mounted in its said bearings and engaging the rack gear and one of said stirring shaft gears providing for said driving connection therebetween, and under-imposed elevating and lowering means supporting the rack gear and said rotatable head member.

CARL L. KENNEY.